Nov. 11, 1941.  J. J. EICHMANN  2,262,577
ELECTRICALLY PREHEATED BLOWTORCH
Filed Dec. 2, 1940
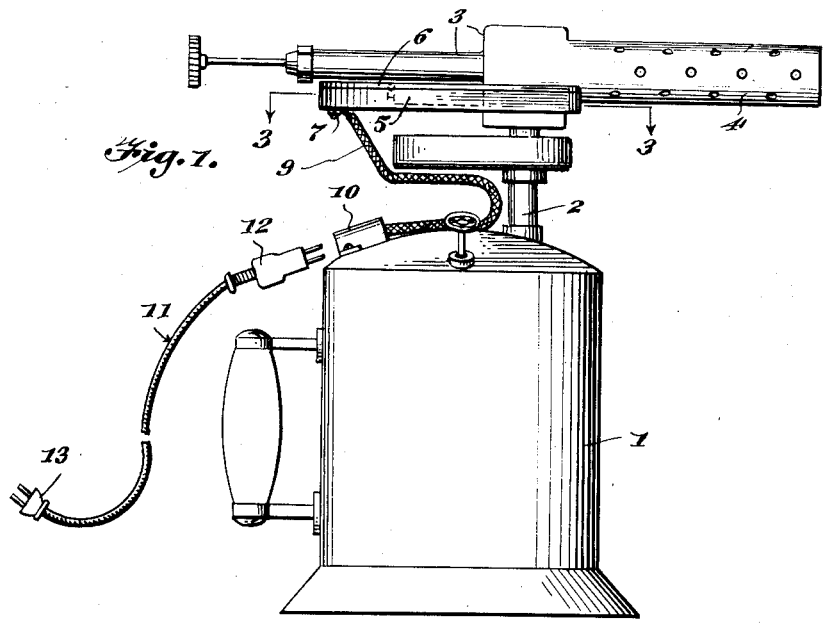
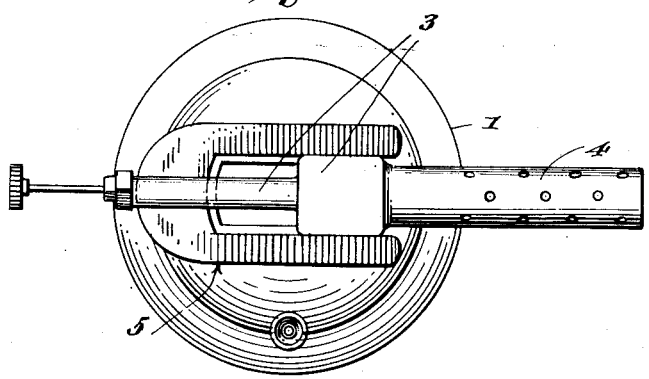
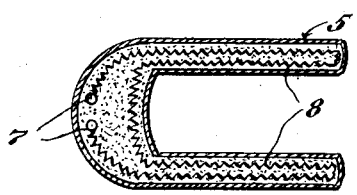
Inventor,
JOSEPH J. EICHMANN.
By E. E. Vrooman & Co,
His Attorneys.

Patented Nov. 11, 1941

2,262,577

UNITED STATES PATENT OFFICE 2,262,577

ELECTRICALLY PREHEATED BLOWTORCH

Joseph J. Eichmann, Wildwood Crest, N. J.

Application December 2, 1940, Serial No. 368,265

1 Claim. (Cl. 219—22)

This invention relates to an electrically preheated blow-torch.

An object of the invention is to eliminate the use of the ordinary drip cup, by employing an efficient electrical heating means in connection with the valve unit of a blow-torch.

Another object of the invention is the construction of a novel and efficient electrical heating device that can be placed on an ordinary blow-torch, for heating the valve unit thereof.

A still further object of the invention is the construction of a novel substantially U-shape heating device which will partly fit around a portion of the valve unit of a blow-torch, and which unit can be easily supplied with electrical current, for the heating of the device.

With the foregoing and other objects in view, the invention comprises certain novel constructions, combinations, and arrangements of parts as will be hereinafter fully described, illustrated in the accompanying drawing, and more particularly pointed out in the appended claim.

In the drawing:

Figure 1 is a view in side elevation of a device constructed in accordance with the present invention, shown applied to an ordinary blowtorch, while Figure 2 is a top plan view of the same.

Figure 3 is a sectional view taken on line 3—3, Fig. 1, and looking in the direction of the arrow 5.

Referring to the drawing, in which I have shown the preferred embodiment of my invention, 1 designates the tank of an ordinary blowtorch. The tank 1 is provided with a vertically-extending suitable supply pipe 2, upon the upper end of which is mounted the valve unit 3. A suitable manifold 4 extends from the valve unit 3.

My novel electrical heating device comprises a substantially U-shape casing 5, that is conveniently provided with a cover 6 (Fig. 1) so that the operator may have ready access to the interior of the casing 5, either when assembling the parts, or in case of repair. Two terminal bolts 7 are provided, extending vertically in the casing 5, and within the casing a heating wire 8 is positioned with its ends fastened to said bolts 7 (Fig. 3). A cable 9 is provided, having two wires that have their ends attached to bolts 7, while their opposite ends terminate in a holder 10; this holder 10 is fastened to the top of tank 1, as clearly shown in Figure 1. A suitable plug-in device 11 is provided, with its plug 12 adapted to enter holder 10 and complete the contact. The plug 13 of device 11 may be plugged in to any outlet in the building for securing the necessary current for operating the heating device.

The casing 5 can be securely held in position against or about the valve unit 3 by any suitable ordinary means.

The heating wire 8 will be heated, resulting in casing 5 heating the valve unit 3, which will eliminate using a drip cup. It is undesirable to use a drip cup, by reason of the oil or gasoline spilling, and igniting foreign substances, or possibly burning the operator's hands. The fire hazard is great when a drip cup is used to heat the valve unit, whereas the danger from using a drip cup is entirely eliminated by the adoption or use of my electrical heating device. Then, too, the electrical heating device can be applied easily to any ordinary blow-torch thereby making it a valuable attachment.

It is to be noted that the heating device extends substantially the entire length of the valve unit, thereby giving a large heating area, which produces a maximum amount of efficiency, resulting in quick and easy operation of the blowtorch.

While I have described the preferred embodiment of my invention and illustrated the same in the accompanying drawing, certain changes or alterations may appear to one skilled in the art to which this invention relates during the extensive manufacture of the same and I, therefore, reserve the right to make such changes or alterations as shall fairly fall within the scope of the appended claim.

What I claim is:

In combination with a blow-torch having a tank, a vertical discharge pipe, a horizontal valve mounted upon the upper end of said pipe, and a tubular mixing chamber extending forwardly from said valve, of a pre-heater for the blowtorch comprising a U-shaped casing of shallow depth extending horizontally with its arms straddling the junction of the chamber and the valve, and means mounting the casing under the valve in close proximity to the valve, terminal posts carried by said casing at the bridge end thereof, a heating coil in said casing insulated therefrom and secured at its ends to said posts, a socket mounted upon the tank, and a conductor cable having ends of its wires secured to terminals of the socket and to said posts.

JOSEPH J. EICHMANN.